US012008349B2

(12) United States Patent
Hosokawa (10) Patent No.: US 12,008,349 B2
(45) Date of Patent: Jun. 11, 2024

(54) INFORMATION PROCESSING APPARATUS, INFORMATION PROCESSING METHOD, AND NON-TRANSITORY STORAGE MEDIUM

(71) Applicant: KABUSHIKI KAISHA TOSHIBA, Tokyo (JP)

(72) Inventor: Akira Hosokawa, Ichikawa Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 17/470,109

(22) Filed: Sep. 9, 2021

(65) Prior Publication Data
US 2022/0138147 A1 May 5, 2022

(30) Foreign Application Priority Data
Oct. 29, 2020 (JP) .................................. 2020-181245

(51) Int. Cl.
*G06F 8/41* (2018.01)
*G06F 8/33* (2018.01)
*G06F 16/28* (2019.01)

(52) U.S. Cl.
CPC .................. *G06F 8/43* (2013.01); *G06F 8/33* (2013.01); *G06F 16/289* (2019.01)

(58) Field of Classification Search
CPC . G06F 8/43; G06F 8/33; G06F 16/289; G06F 9/453
See application file for complete search history.

(56) References Cited

U.S. PATENT DOCUMENTS

| | | | | |
|---|---|---|---|---|
| 2012/0198415 | A1* | 8/2012 | Brandt | ...................... G06F 8/73 717/104 |
| 2014/0115012 | A1* | 4/2014 | Das | ...................... G06F 16/211 707/803 |
| 2019/0155717 | A1* | 5/2019 | Hess | ................... G06F 11/3684 |
| 2019/0317938 | A1 | 10/2019 | Agarwalla et al. | |
| 2020/0320045 | A1* | 10/2020 | Piecko | ................... G06F 16/212 |

FOREIGN PATENT DOCUMENTS

JP 2017-188137 A 10/2017
WO WO 2017/170459 A1 10/2017

OTHER PUBLICATIONS

Understanding Entity Framework Core And Code First Migrations In EF Core, by Akhil Mittal, www.c-sharpcorner.com, Nov. 17, 2018. (Year: 2018).*

* cited by examiner

*Primary Examiner* — Jay A Morrison
(74) *Attorney, Agent, or Firm* — Finnegan, Henderson, Farabow, Garrett & Dunner, LLP (57) ABSTRACT

One embodiment of the present invention provides an information processing apparatus which detects lack of information set to an information model and recommends editing. An information processing apparatus which is one embodiment of the present invention includes an acquirer and an editing recommender. The acquirer acquires content to be edited for the information model. The editing recommender outputs information which recommends editing the information model on the basis of a function template to which information set to the information model is applicable or a function model to which the information set to the information model is applied, and the content to be edited.

13 Claims, 9 Drawing Sheets

FILE | VALIDATION | CHECK FUNCTION TEMPLATE

72

2C: AAA001 — AAA002 — AAA003

PROPERTY LIST OF AAA003 — 71A

| | ID | Name.en | Synonym | Datatype | unit | Quantity |
|---|---|---|---|---|---|---|
| ☐ | EEE001 | manufacturer | | STRING | | |
| ☐ | EEE002 | model number | | STRING | | |
| ☐ | EEE003 | serial number | | STRING | | |
| ☐ | EEE006 | internal pressure | | REAL | kg/m³ | pressure |
| ☐ | EEE007 | nominal rotational speed | | REAL | rpm | rotational speed |
| ☒ | EEE008 | | | | | |

SUPPORTING FUNCTION MODEL LIST — 71C

☐ FUNCTION TEMPLATE 1
☒ FUNCTION TEMPLATE 2

TURBINE OUTPUT PERFORMANCE CURVE
TURBINE OUTPUT MW/h vs time (h)

VALIDATION RESULT — 71B

| ID | type | description |
|---|---|---|
| EEE001 | ER01 | ERRONEOUS INPUT |
| EEE002 | ER03 | LACK OF INFORMATION |
| EEE003 | ER03 | LACK OF INFORMATION |
| EEE004 | ER01 | ERRONEOUS INPUT |
| EEE005 | ER01 | ERRONEOUS INPUT |
| EEE008 | ER03 | LACK OF INFORMATION |

INFORMATION PROCESSING APPARATUS, INFORMATION PROCESSING METHOD, AND NON-TRANSITORY STORAGE MEDIUM

CROSS-REFERENCE TO RELATED APPLICATION (S)

This application is based upon and claims the benefit of priority from Japanese Patent Application No. 2020-181245, filed Oct. 29, 2020; the entire contents of which are incorporated herein by reference.

FIELD

Embodiments described herein relate generally to an information processing apparatus, an information processing method, and a non-transitory storage medium.

BACKGROUND

In software development, an information model which includes a class indicating classification, or the like, of an object and properties representing characteristics of the object associated with the class, is sometimes used. For example, use of the information model eliminates a difference between different data sources and eliminates the need of individual support for each data source. For example, in a case where pieces of data are extracted from respective different data sources, there can be a case where units of the acquired data are different. It is possible to reduce load on software developers by preventing a circumstance where information such as that on a unit is different among respective data sources by using a common information model among the data sources to prevent such a circumstance.

Further, there is "modularization" as one means for efficiently developing software. Modularization can prevent redundant development of the same type of functions to be executed by software. For example, by modularizing a display screen, it is possible to eliminate labor such as that for developing a display screen for each content to be outputted. Such modularized function is also called a "function template". By applying information included in the information model to the function template, it is possible to easily implement functions which perform the same processing but inputs/outputs different kinds of information.

In a case where the function template uses information on the information model in this manner, a user preferably performs editing work while taking account of the function template when the user edits the information model. For example, when the user tries to apply information on a new class or a new property to the function template after adding the class or the property to the information model, the user sometimes notices that the information is not set to the class or the property. In this case, it is necessary to perform editing work again on the information model to add the information, which can be load on an administrator of the information model. However, it is also difficult for the administrator of the information model to recognize information to be used by the function template when the administrator edits the information model, and it is troublesome for the administrator to perform editing work while taking account of all the function templates.

DETAILED DESCRIPTION

One embodiment of the present invention provides an information processing apparatus which detects lack of information set to an information model and recommends editing.

An information processing apparatus as one embodiment of the present invention includes an acquirer and an editing recommender. The acquirer acquires content to be edited for an information model. The editing recommender outputs information which recommends editing the information model on the basis of a function template to which the information set to the information model is applicable or a function model to which the information set to the information model is applied, and the content to be edited.

Below, a description is given of embodiments of the present invention with reference to the drawings. The present invention is not limited to the embodiments.

First Embodiment

Figure 1:
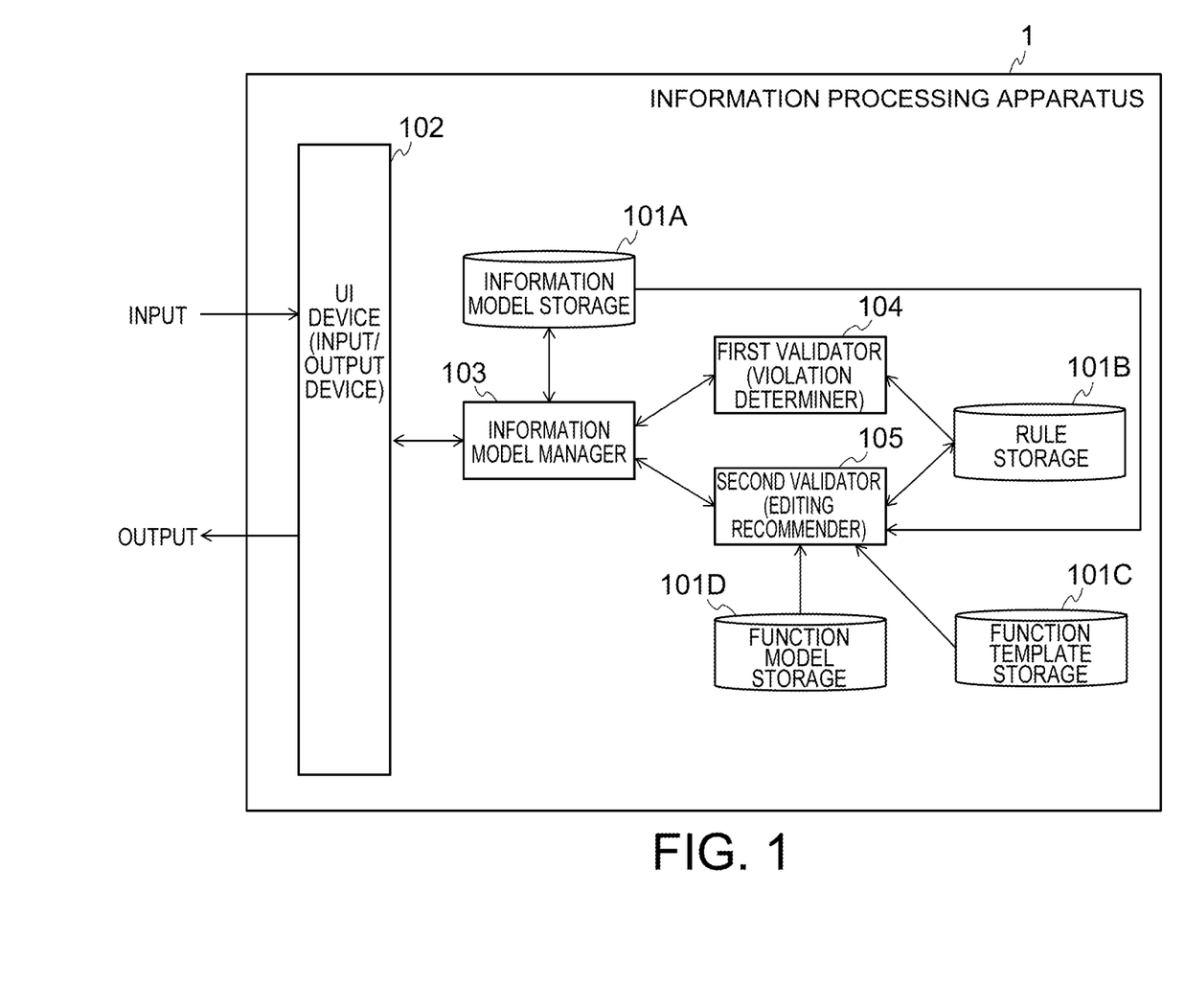
FIG. 1 is a block diagram illustrating an example of an information processing apparatus according to a first embodiment.

FIG. 1 is a block diagram illustrating an example of an information processing apparatus according to a first embodiment. An information processing apparatus 1 according to the present embodiment includes an information model storage 101A, a rule storage 101B, a function template storage 101C, a function model storage 101D, a UI device (an input/output device) 102, an information model manager 103, a first validator (a violation determiner) 104, and a second validator (an editing recommender) 105.

Note that the example in FIG. 1 separately illustrates storages for each piece of data to be stored for convenience sake. The information model storage 101A is a storage which stores information models, the rule storage 101B is a storage which stores rules for determining a violation, the function template storage 101C is a storage which stores function templates, and the function model storage 101D is a storage which stores function models. However, actually, the storage does not have to be subdivided in this manner, and these storages may be collectively implemented with a memory, a hard disk, a network storage, or the like. Further, a storage 101 indicates all of these storages.

Further, as well as the storage 101, components of the information processing apparatus 1 illustrated in FIG. 1 may be subdivided or aggregated. Further, the information processing apparatus 1 may have components which are not illustrated in FIG. 1. For example, the UI device 102 may be separated into an input device and an output device. Further, for example, part of components may be included in an apparatus different from the information processing apparatus 1. In other words, the information processing apparatus 1 may be constituted with a plurality of apparatuses. An apparatus is often divided into apparatuses which are specialized in performing respective processes in an information processing system to distribute processing load, maintain availability, and the like. In other words, the information processing apparatus 1 may be an apparatus which operates alone or may be a client-server type apparatus which coordinates with a server on a communication network such as cloud.

In the present embodiment, an information model is used. The information model is used in software development, or the like, and defines description specifications for data to be used by software. For example, use of a common information model prevents a circumstance where notation such as a unit of information indicated by the data is different in each data source even for different types of data sources such as a search engine and a database.

Figure 2:
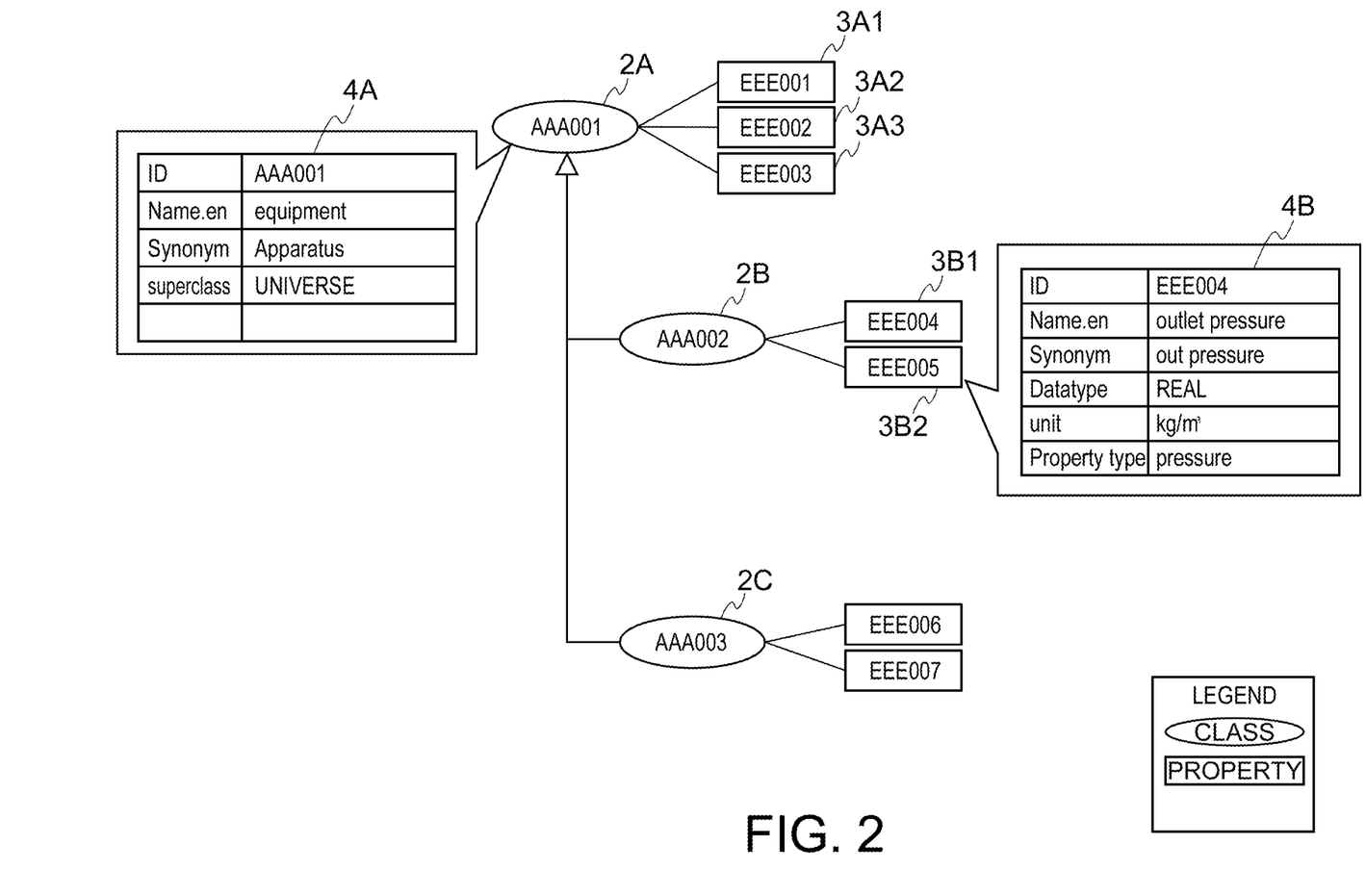
FIG. 2 is a diagram explaining an information model.

FIG. 2 is a diagram explaining the information model. The example in FIG. 2 systematically illustrates the information model which includes a class indicating classification, or the like, of an object and properties representing characteristics of the object associated with the class. In the example in FIG. 2, classes are expressed with elliptic objects, properties are expressed with rectangular objects, and relationships between classes and properties are systematically indicated as tree-shaped graph data.

The classes each correspond to a concept including what some call object, person and matter. Note that classes have a hierarchical relationship, and properties of a superclass are inherited by its subclasses. In other words, properties associated with a superclass are also associated with its subclasses. Note that there can be a case where the information model does not include such a hierarchical relationship among classes. In other words, there can be an information model including only classes having a flat relationship.

In the present embodiment, a property has at least a primitive value such as a numerical value, a character string, a date and an array or structured data, as a value of the property. For example, a property "flow rate" of a class "pump" has a value of a flow rate of a pump detected by a sensor, or the like.

Further, each class and each property have unique identifiers. Note that a name which can be recognized by a human other than identifiers may be provided, and the name may be expressed in multiple languages.

In the example in FIG. 2, a class 2A having an identifier "AAA001" has three properties including a property 3A1 having an identifier "EEE001", a property 3A2 having an identifier "EEE002", and a property 3A3 having an identifier "EEE003", and further has a subclass (also referred to as a child class or a subclass) 2B having an identifier "AAA002" and a subclass 2C having an identifier "AAA003".

Further, while the example in FIG. 2 indicates that a class 2B having an identifier "AAA002" has two properties including a property 3B1 having an identifier "EEE004" and a property 3B2 having an identifier "EEE005", the class 2B also inherits three properties of the class 2A which is a superclass of the class 2B, and thus has a total of five properties from "EEE001" to "EEE005".

Further, the class and the properties have attributes. In the present embodiment, the attributes represent information regarding the class and the properties. For example, semantic attributes such as a unit and a type are set in addition to semantic information such as a name and a definition.

In the example in FIG. 2, a table 4A indicates attributes of the class 2A and a table 4B indicates attributes of the property 3B2. First columns of the table 4A and the table 4B indicate attributes, and second columns indicate information set to the attributes (which can be also regarded as values of the attributes). For example, in the table 4A, an attribute "superclass" is indicated, and information set to the attribute is "UNIVERSE". This represents that the class 2A has a value of an attribute of "UNIVERSE". Note that the value of the attribute "UNIVERSE" means that the class does not have a superclass (also referred to as a parent class). Thus, it can be understood that the class 2A does not have a superclass. Note that while information is indicated in all cells in the second columns in the table 4A and the table 4B in FIG. 2, there can be a case where the tables have blank cells.

It is assumed in the present embodiment that such an information model is generated in advance, and editing is performed on the information model. For example, classes or properties are added, changed or deleted. Further, for example, values of attributes of classes or properties are added, changed or deleted. In this manner, a term of "editing" includes at least one of addition, change and deletion.

The function template is an abstract template which can handle various kinds of data representing an object, a person, a matter, or the like. The function template in the present embodiment can set (may apply or associate) information set to the information model, specifically, values of attributes of classes or properties, or values of properties. The function template in which the information is set becomes a function model which represents the set information.

Figure 3:
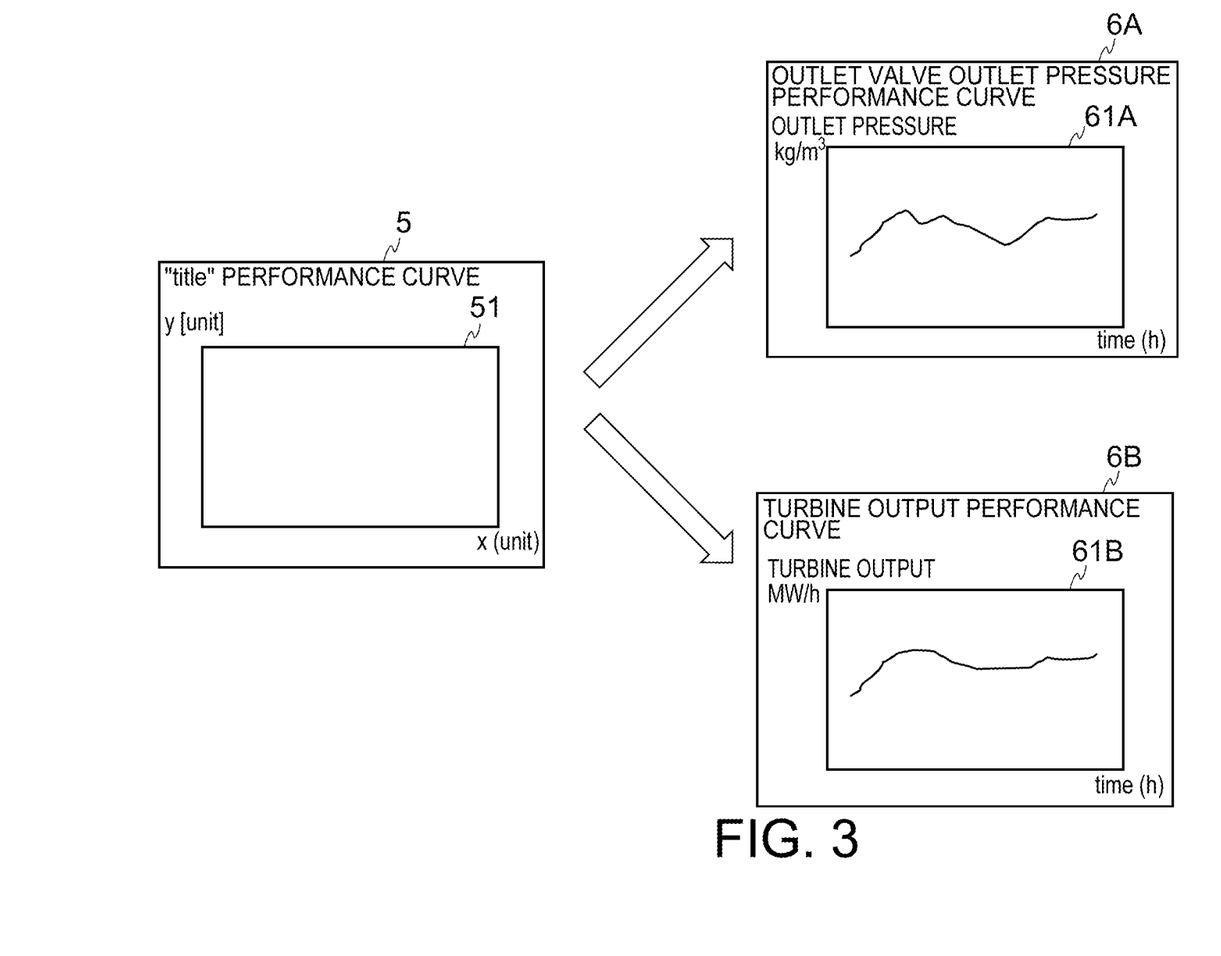
FIG. 3 is a diagram explaining a function template and a function model.

FIG. 3 is a diagram explaining the function template and the function model. FIG. 3 illustrates a function template 5 on a left side. The function template 5 in FIG. 3 is a function template for displaying a graph. While the function template 5 includes "title", this "title" is a variable, and a name of a class or a property applied to the function template is set to the "title" when the function model is generated. Further, "x (unit)" and "y (unit)" are also variables, and one of values of attributes of the applied class or property is set as an item name indicated by each coordinate axis and a unit thereof when the function model is generated. Further, a graph (a graph of sequential data) indicating a relationship of values of two set items is indicated in a display region 51 within the function template 5.

FIG. 3 illustrates, on a right side, two function models 6A and 6B generated from the function template on the left side. The function model 6A is obtained by applying a property "outlet valve outlet pressure" to the function template. The function model 6A is generated by setting a name "outlet valve outlet pressure" of the property to the "title" of the function template, setting a name "time" of the property and a unit thereof "h (hour)" to an x axis, and setting the name "outlet pressure" of the property and a unit thereof "kg/m$^3$" to a y axis. Further, a graph indicating a relationship between "time" and "outlet pressure" is indicated in a display region 61A within the function model 6A. The function model 6B is obtained by applying properties "time" and "turbine output" to the function template. The function model 6B is generated by setting a name "turbine output" of the property to the "title" of the function template, setting a name "time" of the property and a unit thereof h (hour) to the x axis, and setting the name "turbine output" of the property and a unit thereof "MW/h" to the y axis. Further, a graph indicating a relationship between "time" and "turbine output" is indicated in a display region 61B within the function model 6B.

A plurality of function models can be generated by applying different classes and properties to one function template in this manner, so that the function template indicates values of attributes of the applied classes and properties, or values of the properties. This eliminates the need to create a dedicated module for each piece of information to be set to the function template, so that it is possible to prevent increase in workload of software development, engineering cost, or the like.

Note that while the function template 5 in the example in FIG. 3 is used for displaying a graph, use application of the function template is not limited to such screen display. Functions having functions to be used, processing, or the like, in common may be generated as the function template.

Kinds of processing of the information processing apparatus 1 will be described next along with an internal configuration.

The storage 101 stores data to be used by components of the information processing apparatus 1, processing results of the respective components, or the like. While FIG. 1 indicates a flow of data among some components with arrows for explanatory convenience, data may be exchanged among all components.

The storage 101 may be constructed with a database such as a relational database or may be a memory or a storage which stores files in a format of CSV or XML.

The UI device (the input/output device) 102 accepts input of information to be used for processing of the information processing apparatus 1 and outputs a processing result of the information processing apparatus 1. Further, the UI device 102 acquires a response to output, for example, approval for an output proposal, or the like. The UI device 102 may be, for example, a graphical user interface (GUI) which can output a screen for editing the information model and accept input of editing of the information model from the user. Alternatively, the UI device 102 may be a communicator which transmits/receives a command, a file, or the like, for editing. In other words, an input/output format of the UI device 102 is not particularly limited.

Note that a method for obtaining information to be used for processing of the information processing apparatus 1 is not particularly limited. The information may be transmitted from an input device such as a keyboard, a mouse and a touch panel, or a communication device connected via a network and may be passively received by the UI device 102. Alternatively, a path indicating a position of data may be set to the information processing apparatus 1, and data at the path may be actively read out by the UI device 102.

The information model manager 103 manages the information model and controls processing on the information model. For example, an information model editor accepts input of editing of the information model via the UI device 102. Further, in a case where it is confirmed that content to be edited does not commit a violation, the information model editor reflects the content to be edited in the information model and stores the information model in the information model storage 101A. Note that the information model stored in the information model storage 101A may be updated, or the information model may be recorded as another version without the information model being overwritten.

Further, the information model manager 103 may generate an image, or the like, for a GUI to edit the information model. For example, in a case where an improvement proposal for the acquired content to be edited is made, the information model manager 103 may generate an image which displays the improvement proposal. Note that processing for input/output for GUI generation, or the like, is the same as processing in a case of typical software, and it is only necessary to use well known related art.

The first validator 104 determines whether the content to be edited does not commit a violation in response to an instruction from the information model manager 103. Then, the first validator 104 returns a processing result such as content of the detected violation and a portion of the violation to the information model manager 103. For example, the first validator 104 determines whether the content to be edited follows a rule stored in the rule storage 101B. For example, it is determined whether a predetermined rule is satisfied, such as whether the first character of a character string set to the attribute is a capital letter, whether the number of characters of the character string is equal to or less than an upper limit value, and whether the character string does not include a predetermined prohibited character.

Further, for example, the first validator 104 determines whether the content to be edited does not commit a violation on the basis of a set operation expression of class theory. Specifically, the first validator 104 converts information set to the information model into a mathematical expression. Further, the first validator 104 also converts information regarding the content to be edited into a mathematical expression. Calculation processing as to whether consistency is satisfied is executed using these mathematical expressions. By this means, a violation is detected. For example, the relationship between classes and properties as illustrated in FIG. 2, in other words, a data structure is converted into a relational expression, and it is confirmed whether the mathematical expression representing the content to be edited satisfies the relational expression.

For example, it is known that a logical operation such as a union, an intersect and an except can be performed using language such as structured query language (SQL) and class query language (CQL) which makes an inquiry as to a structure of data (a data model). In the same manner as such language, in a case where the content to be edited is approved, it is only necessary to determine whether consistency is maintained before and after the information model is edited from the set operation expression.

For example, a class is defined with a description such as $C=\{x|P(x)\}$ in terms of mathematical logic. "C" indicates a class, "x" indicates an element of the class, and $P(x)$ indicates intension of the class C. Here, $P(x)$ is expressed with a hybrid of properties of the class, that is, expressed with $C=\{x|P_1(x, s_1) \wedge P_2(x, s_2) \wedge \ldots P_n(x, s_n)\}$. $P_1$, $P_2, \ldots, P_n$ represent the properties of the class C, and $s_1$, $s_2, \ldots, s_n$ are values of the properties. As an example where inconsistency is detected, in a case where it is required to satisfy a constraint expression of $C_a = C_d \wedge C_a$ between two classes $C_d$ and $C_a$, in a case where $C_d=\{x|P_1(x, s_1) \wedge P_2(x, s_2)\}$, and $C_a=\{X|P_1(x, s_1) \wedge P_2(x, s_2) \wedge P_3(x, s_3)\}$, a relationship between $C_a$ and $C_d$ becomes such that $C_a \neq C_d \wedge C_a$, which does not satisfy the constraint expression, and thus, it is determined as inconsistency.

The second validator 105 (the editing recommender) proposes to edit the information model on the basis of the function template or the function model and the content to be edited. In other words, the second validator 105 outputs information which recommends editing. For example, the second validator 105 may detect attributes for which information would be better set among attributes of the information model and may propose to set information for at least one of the detected attributes. Alternatively, the second validator 105 may propose to add a new property to the information model. In this manner, the second validator 105 recommends editing by reminding the user of insufficient editing.

Note that while the second validator 105 detects attributes for which information would be better set, for a certain class or property, there can be a case where the attributes themselves have already been set for the class or the property, and a case where the attributes are not set.

For example, as described above, there can be attributes for which information is not set among the attributes set for the classes or the properties. The second validator 105 can detect attributes for which information would be better set among such attributes. Further, there can be attributes which are set for certain properties but which are not set for other properties. The second validator 105 can detect attributes which are not set for the class or the property, for a certain class or property as attributes for which information would be better set. In other words, the second validator 105 proposes to add values of attributes.

Specifically, the second validator 105 detects a function template or a function model which relates to the content to be edited (matches the content to be edited) among at least one of the function templates stored in the function template storage 101C and the function models stored in the function model storage 101D. Then, the second validator 105 detects attributes which can be applied by the detected function template or which are applied by the detected function model. The detected attributes are proposed as attributes for which information would be better set. Note that in a case where a plurality of attributes are detected, part of the attributes may be proposed instead of all of the attributes being proposed.

More specifically, the second validator 105 calculates a "degree of semantic structural similarity" between a class or a property to be edited and a class or a property included in the information model. The degree of semantic structural similarity can be also calculated on the basis of a set operation expression of class theory, estimation of a degree of similarity in a term using a machine readable dictionary, calculation of intersection of partial character strings extracted through n-gram, or the like, commonality of types of properties, commonality of values of properties, commonality of data types of properties, commonality of quantity to which a unit of properties belongs, or the like, in the same manner as the first validator 104.

The second validator 105 detects a class and a property which are similar to the class and the property to be edited on the basis of the calculated degree of similarity. Hereinafter, the detected class and property will be described as a similar class and a similar property. Note that it is only necessary to determine a class or a property which is determined to have a degree of similarity higher than a predetermined threshold as the similar class or the similar property. The threshold may be determined as appropriate.

Then, a function template to which information set to attributes of the similar class and the similar property can be applied, or a function model to which information set to the attributes of the similar class and the similar property is applied, is detected.

Note that in a case where a class or a property which can be applied to the function template is registered in advance and can be recognized, the function template may be detected on the basis of information relating to the registration, and otherwise, the function model may be detected. It is also possible to detect a function model and detect a function template which is a basis of the detected function model.

The function template which is a basis of the function model to which the similar class or the similar property is applied is highly likely to be applied to the edited class or property. Thus, attributes which can be set to the detected function template and attributes which are set to the detected function model preferably have the edited class or property, and information is preferably set for the attributes. Thus, attributes for which information would be better set are detected and presented to the user via the information model manager 103 and the UI device 102 in this manner.

In a case where the user adds information to the attributes in accordance with this presentation, the information model manager 103 updates the information model by adding the added information to the information model. Note that the processing of the first validator 104 and the second validator 105 may be performed again.

Further, the second validator 105 may propose information which would be better set for attributes for which information is not set. For example, while the function model is detected in a case where attributes for which information would be better set are detected, it is also possible to propose attributes which are set to the detected function model.

Further, the second validator 105 can propose to add a new property. For example, in a case where a property regarding a flow rate which can be set is added on a y axis of the function template which displays a graph, the second validator 105 performs a search as to whether the information model includes properties which are likely to correspond to an x axis. The properties which are likely to correspond to the x axis may be obtained by, for example, detecting similar properties to the added flow rate property, detecting a similar property which is associated with the y axis of the graph of the function model among the detected similar properties, and setting the similar property of the property on the x axis of the graph of the function model as the property which is likely to correspond to the x axis. In a case where it turns out that the information model does not include the property which is likely to correspond to the x axis, it is also possible to propose to add the property which is likely to correspond to the x axis or propose to add a property of a pressure. In this manner, it is possible to make a proposal as to a property.

Further, the second validator 105 may update the rules stored in the rule storage 101B on the basis of whether or not the proposal is acceptable. For example, a threshold for determining the similar class or the similar property may be adjusted to be an optimal value by increasing/decreasing the threshold in accordance with whether or not the proposal is acceptable.

Figure 4:
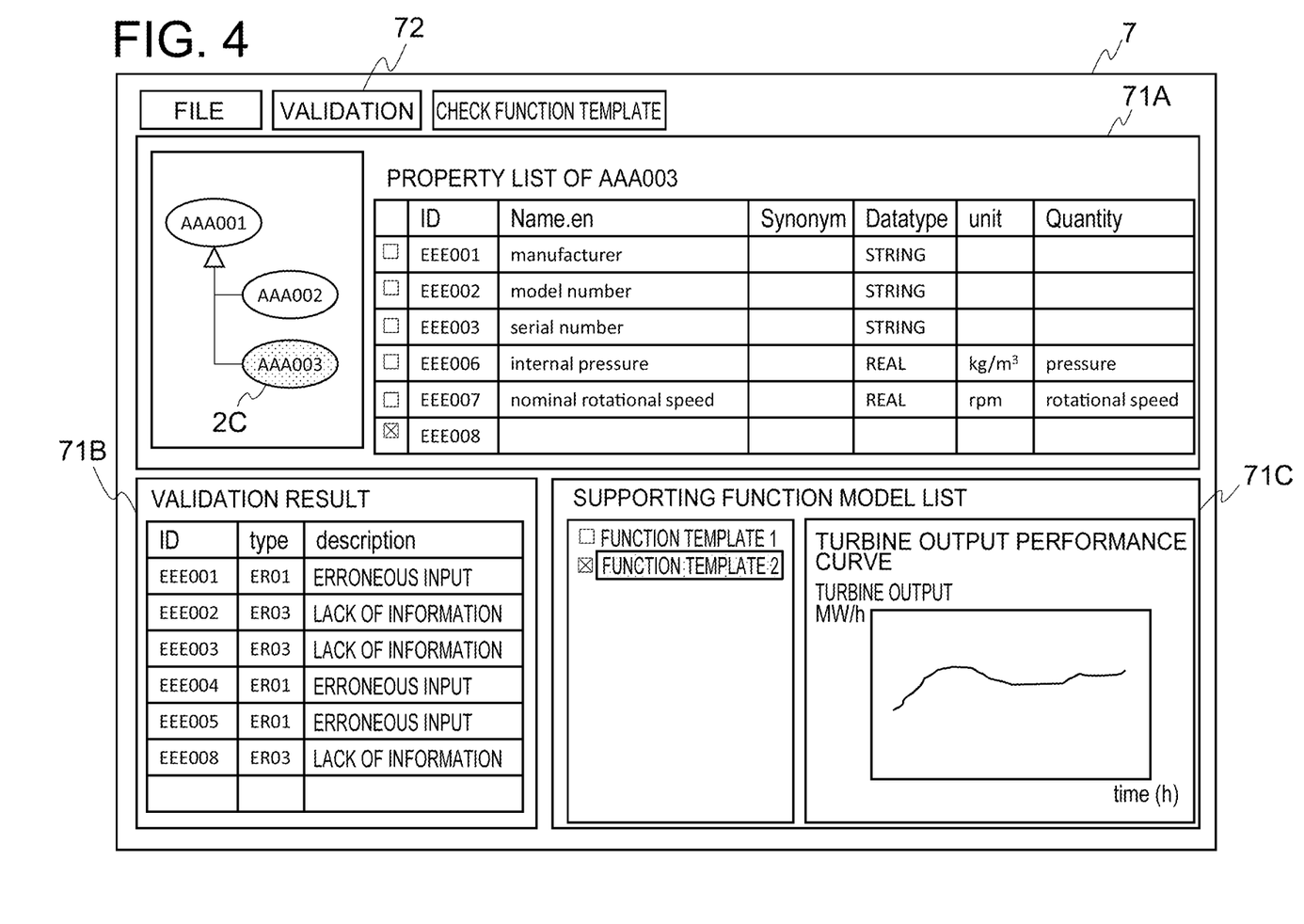
FIG. 4 is a diagram illustrating an example of an input/output interface for editing the information model.

FIG. 4 is a diagram illustrating an example of an input/output interface for editing the information model. FIG. 4 illustrates an input/output interface 7 which is separated into some regions. A class hierarchy of the information model and content of properties of the selected class are displayed in a left part of an upper display region 71A. In FIG. 4, a class 2C of "AAA003" is selected, and the class 2C is displayed with a dot pattern. Further, properties of the selected class 2C and attributes of the properties are indicated in a tabular format in a right part of the display region 71A.

Results of violation determination by first validation and proposals by second validation are displayed along with the property in a display region 71B in a lower left part of the input/output interface 7. For example, in the display region 71B, a display of "lack of information" is indicated for a property EEE008. Editing of the information model may be encouraged by a child t which provides such a display. Note that these kinds of processing are executed by a validation button 72 illustrated in FIG. 4 being depressed.

Note that it is assumed that the user edits a notation in a property list of AAA003 indicated in the display region 71A by viewing a display in the display region 71B. The UI device 102 acquires a result of re-editing in this manner.

Note that FIG. 4 merely illustrates an example, and a screen layout, invoking of functions, or the like, may be determined as appropriate. Further, violation determination and detection of lacking information may be automatically performed immediately after the information model is edited.

Figure 5:
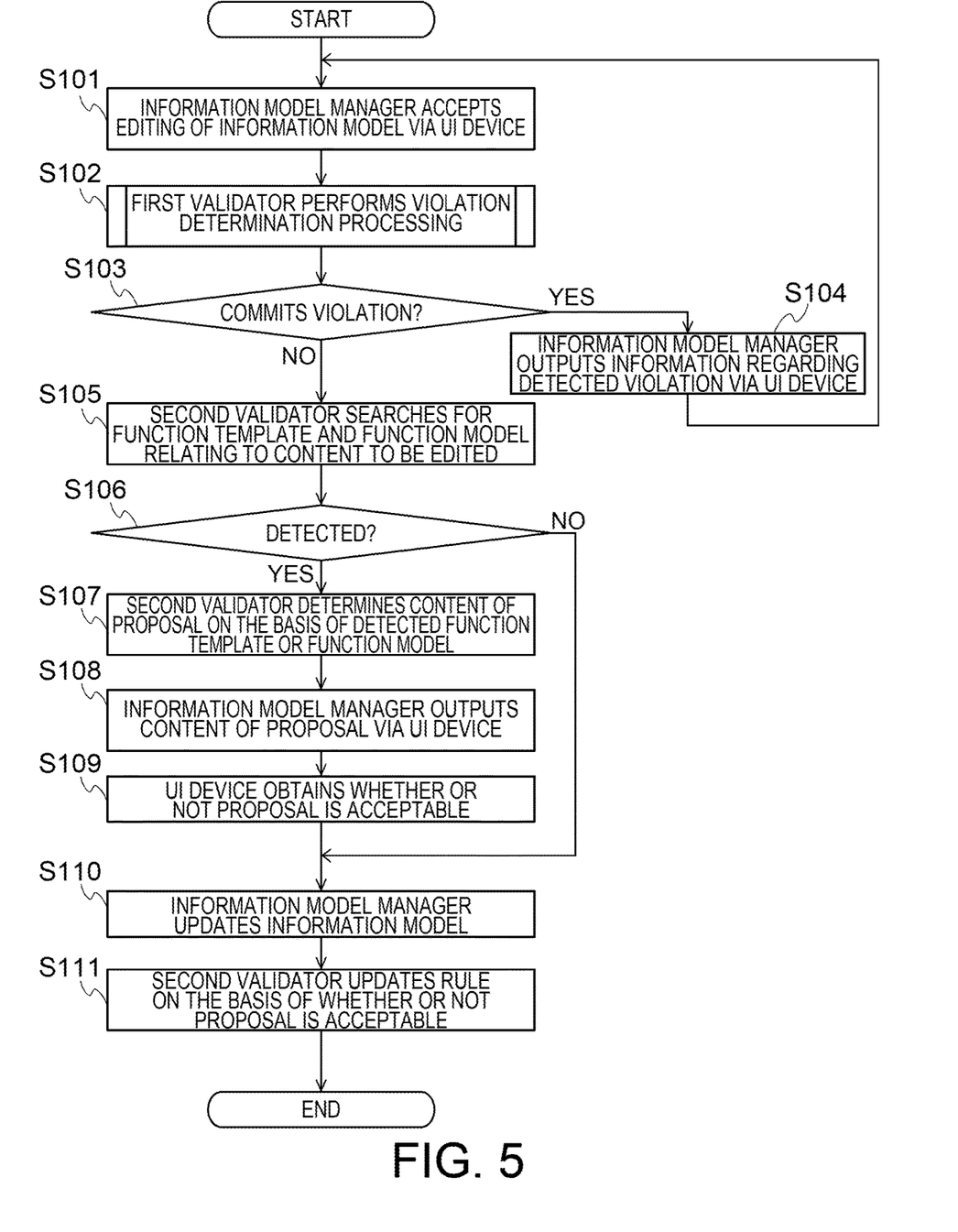
FIG. 5 is a schematic flowchart of entire processing of an information processing apparatus 1 according to the first embodiment.

A flow of kinds of processing of components will be described next. FIG. 5 is a schematic flowchart of entire processing of the information processing apparatus 1 according to the first embodiment. Note that the flowchart in the present description is an example, and the flowchart is not limited to the described example. Procedure may be rearranged, added or skipped in accordance with specifications desired in embodiments, change, or the like. For example, in the present flow, violation determination processing by the first validator is performed first, and in a case where a violation is not detected, and updating is possible, a proposal by the second validation is made for explanatory convenience. Note that these kinds of processing may be performed concurrently.

The information model manager 103 accepts editing of the information model via the UI device 102 (S101). The information model manager 103 transmits content to be edited to the first validator 104 to confirm whether content to be edited does not commit a violation, and the first validator 104 executes violation determination processing (S102). A flow of the violation determination processing will be described later.

In a case where a violation is detected (S103: Yes), the information model manager 103 outputs information regarding the detected violation via the UI device 102 (S104). By this means, as described above, the user corrects the content to be edited, and thus, the information model manager 103 accepts the corrected content to be edited. Thus, violation determination processing is executed again.

In a case where a violation is not detected (S103: No), the second validator 105 searches for a function template and a function model relating to the content to be edited as described above (S105). In a case where a function template or a function model is not detected (S106: No), the processing transitions to processing in S110. In a case where a function template or a function model is detected (S106: Yes), the second validator 105 determines content of a proposal on the basis of the detected function template or function model (S107). In other words, the second validator 105 detects attributes for which information would be better set among attributes of the information model. Further, as described above, information which would be better set for the attributes may be detected. The content of the proposal is outputted by the information model manager 103 via the UI device 102 (S108), and whether or not the proposal is acceptable is acquired by the UI device 102 (S109).

Then, the information model manager 103 updates the information model (S110). The information model manager 103 reflects the acquired content to be edited in the information model in a case where no proposal is made because neither function template nor function model is detected, or in a case where a proposal is not accepted. The information model manager 103 reflects the content to be edited and the content of the proposal in the information model in a case where a function template or a function model is detected, and a proposal is accepted.

Further, the second validator 105, for example, updates a rule such as a threshold for determining a similar class or a similar property on the basis of whether or not the proposal is acceptable to improve accuracy of similarity determination (S111). The entire processing is ended in this manner.

Figure 6:
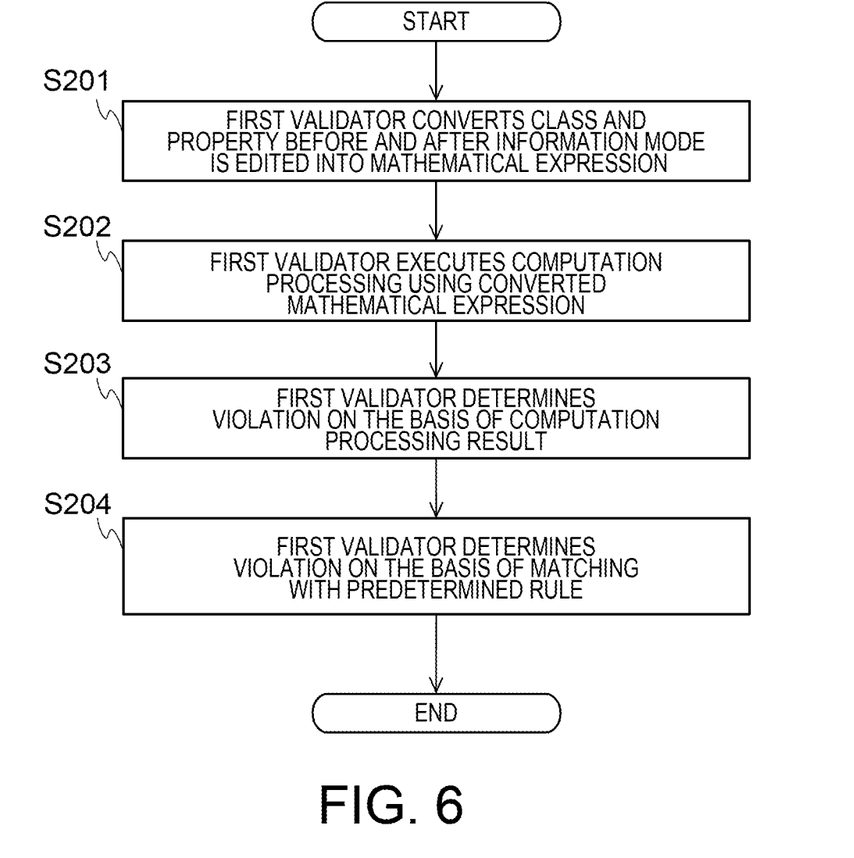
FIG. 6 is a schematic flowchart of violation determination processing.

Further, a flow of violation determination processing by the first validator 104 will be described. FIG. 6 is a schematic flowchart of the violation determination processing.

The first validator 104 converts a class and a property before and after the information model is edited into mathematical expressions (S201). Then, the first validator 104 executes computation processing on the basis of these mathematical expressions (S202). A violation is determined on the basis of the computation processing result (S203). For example, as described above, a relationship between classes and properties included in the information model is converted into a relational expression, and it is confirmed whether a mathematical expression representing content to be edited satisfies the relational expression. In a case where the relational expression is satisfied, it is determined that a rule is not violated.

Further, the first validator 104 determines a violation also on the basis of whether a predetermined rule such as prohibited characters is followed (S204). In this manner, two kinds of determination processing are performed, and the present flow is ended.

As described above, the information processing apparatus 1 of the present embodiment confirms whether the content to be edited does not commit a violation and also confirms lack of information which is to be needed in the future when editing of the information model is accepted. This can prevent a circumstance where the information model is edited again when it becomes necessary to use lacking information. In other words, it is possible to prevent return work which becomes necessary as a result of lacking information being found.

An administrator, or the like, of the information model which is a model on a data side, is often different from an administrator, or the like, of the function model which is a model on a side which utilizes the information model. In such distributed development, one kind of editing work affects other members, companies, or the like, and thus, it is preferable to prevent occurrence of return work as less as possible while taking into account the influence. Thus, it is considerably advantageous to present attributes which would be better set while taking into account how attributes of a class or a property to be edited and values of a property are used when the information model is edited as in the present embodiment.

Further, in conventional related art, object-oriented matching such as determination as to whether data types such as character string types and numerical value types match is performed, and, for example, in a case where a plurality of attributes of a character string type are set, it is difficult to determine which of the attributes is to be matched. Meanwhile, the information processing apparatus 1 of the present embodiment detects lack of information by matching a concept of an information model and a concept of a function template which are originally completely different from each other. Further, the information model to be used in the present embodiment has semantics such as a unit and a type in addition to semantic information such as a name and a definition, and processing which takes into account the semantics is performed. The present embodiment is different from related art in these matters.

Second Embodiment

Figure 7:
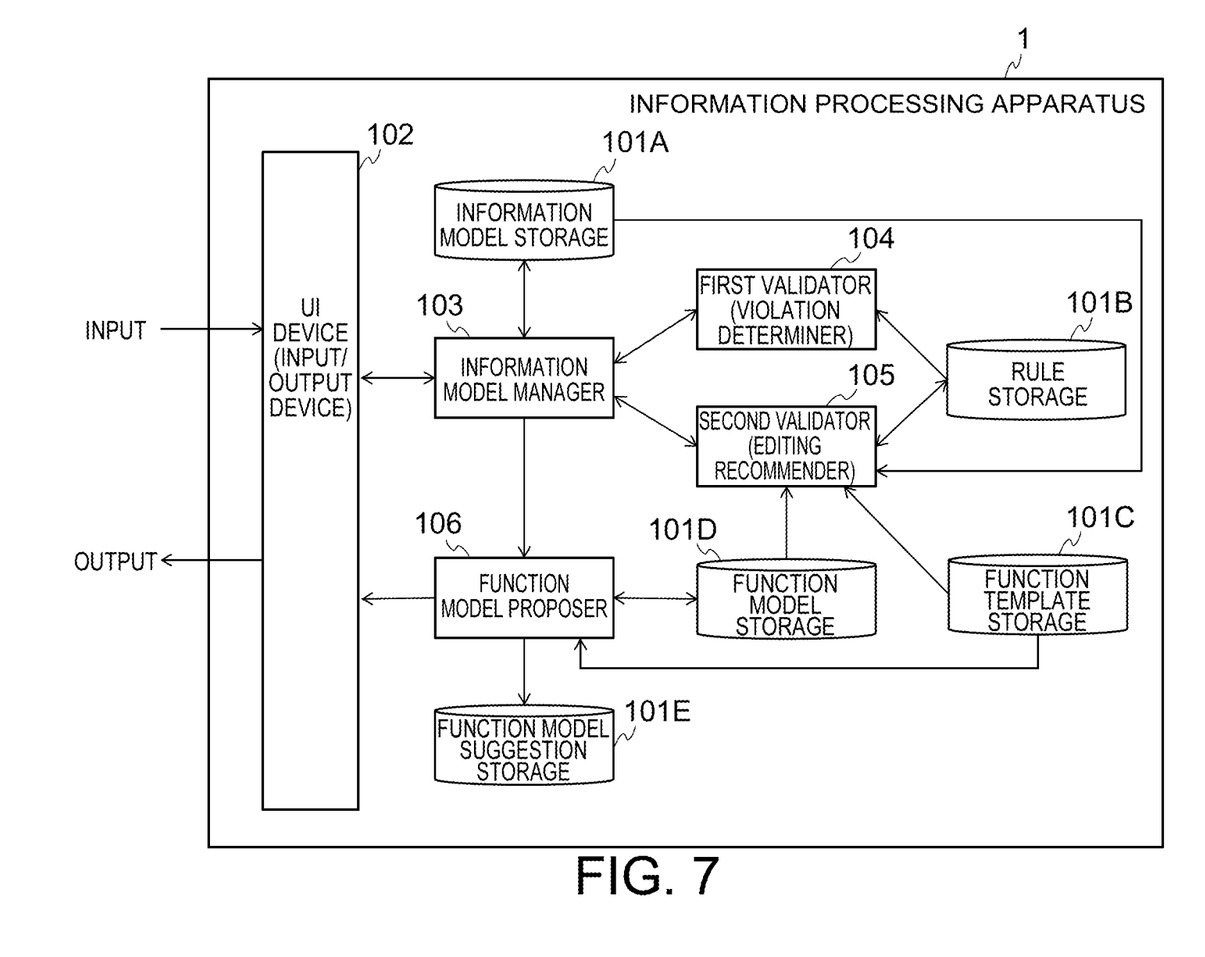
FIG. 7 is a block diagram illustrating an example of an information processing apparatus according to a second embodiment.

FIG. 7 is a block diagram illustrating an example of an information processing apparatus according to a second embodiment. The information processing apparatus 1 according to the present embodiment further includes a function model suggestion storage 101E and a function model proposer 106.

In the first embodiment, it is detected that the information model does not include information which is to be used in the future, and it is proposed to set the information in the information model. In the second embodiment, a function model which is to be generated in the future is generated in advance and it is proposed to register the function model. The function model will be described as a function model suggestion. The function model suggestion is a function model which is not formally registered, in other words, a function model which is not formally recorded in the function model storage 101D. Thus, the function model can be also regarded as a temporary function model, a function model candidate, or the like.

The function model proposer 106 applies attributes of the edited class or property to the function template to generate a function model suggestion. In a case where information is set to the attributes proposed in the first embodiment, it is only necessary to generate a function model suggestion to which the information is applied.

The generated function model suggestion may be outputted via an input/output interface in the same manner as a validation result in the first embodiment. For example, in the example in FIG. 4, a function model suggestion indicating a turbine output performance curve generated by using a "function template 2" is indicated in a display region 71C in a lower right part of the input/output interface 7. In this manner, information regarding the function model suggestion, the applied function template, or the like, may be outputted.

Note that a function template or a function model which becomes a basis of the function model suggestion may be outputted instead of the function model suggestion. For example, it is also possible to encourage the user to generate a function model by outputting the function template and candidates for information to be applied to the function template via the UI device 102.

Further, as described above, there can be a case where the administrator, or the like, of the information model is different from the administrator, or the like, of the function model. Thus, the function model suggestion generated when the information model is edited may be stored in the function model suggestion storage 101E, and the function model suggestion may be invoked from the function model suggestion storage 101E when the administrator of the function model operates the information processing apparatus 1.

In a case where the function model suggestion is approved via the UI device 102, the function model proposer 106 stores the function model suggestion in the function model storage 101D as the function model. The function model suggestion which is not approved may be deleted from the function model suggestion storage or may be left as is.

Figure 8:
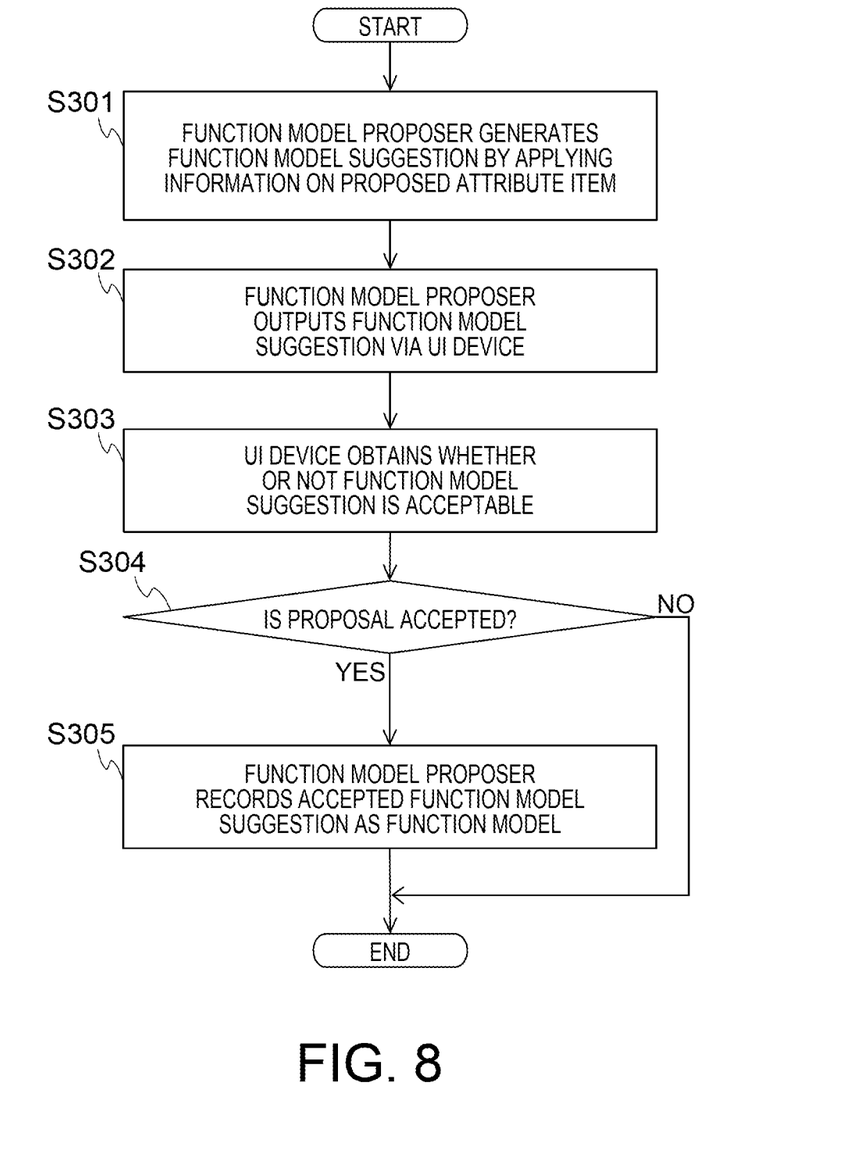
FIG. 8 is a schematic flowchart relating to function model suggestion proposal processing.

A flow of processing in the second embodiment will be described. FIG. 8 is a schematic flowchart regarding function model suggestion proposal processing. The present flow may be executed after the flowchart illustrated in FIG. 5. For example, the present flow may be started after a request from the administrator of the function model is received. Alternatively, the present flow may be executed along with the flowchart illustrated in FIG. 5. For example, the information model manager 103 may output the function model suggestion created through the present flow while outputting the content of the proposal (S108).

The function model proposer 106 applies information on the attributes proposed by the second validator 105 to the function template which is a basis of the proposal to generate a function model suggestion (S301). The function model proposer 106 outputs the function model suggestion via the UI device 102 (S302). Note that the function model suggestion may be outputted immediately after the function model suggestion is generated or the generated function model suggestion may be stored in the function model suggestion storage 101E and outputted after a request from the administrator of the function model is received.

The UI device 102 acquires whether or not to the function model suggestion is acceptable (S303). In a case where the function model suggestion is accepted (S304: Yes), the function model proposer 106 records the accepted function model suggestion in the function model storage 101D as the function model (S305). In a case where the function model suggestion is not accepted (S304: No), the function model suggestion is not stored in the function model storage 101D, and the present flow is ended.

As described above, in the second embodiment, the information processing apparatus 1 automatically generates a function model suggestion instead of the administrator of the function model generating the function model on the basis of the edited information model. By this means, the administrator of the function model only requires to determine whether or not to approve the function model suggestion, which avoids the trouble of applying values of attributes added to the information model to the function template, so that it is possible to reduce engineering cost.

Note that at least part of the above-described embodiments may be implemented with a dedicated electronic circuit (that is, hardware) such as an integrated circuit (IC) in which a processor, a memory, and the like, are mounted. Further, at least part of the above-described embodiments may be implemented by executing software (programs). For example, it is possible to implement processing of the above-described embodiments by using a general-purpose computer apparatus as basic hardware and causing a processor such as a CPU mounted on the computer apparatus to execute the programs.

For example, the apparatus of the above-described embodiments can be implemented as a computer by the computer reading out dedicated software stored in a computer-readable storage medium. A type of the storage medium is not particularly limited. Further, the apparatus of the above-described embodiments can be implemented as a computer by installing dedicated software downloaded via a communication network on the computer. In this manner, information processing using software is specifically implemented using hardware resources.

Figure 9:
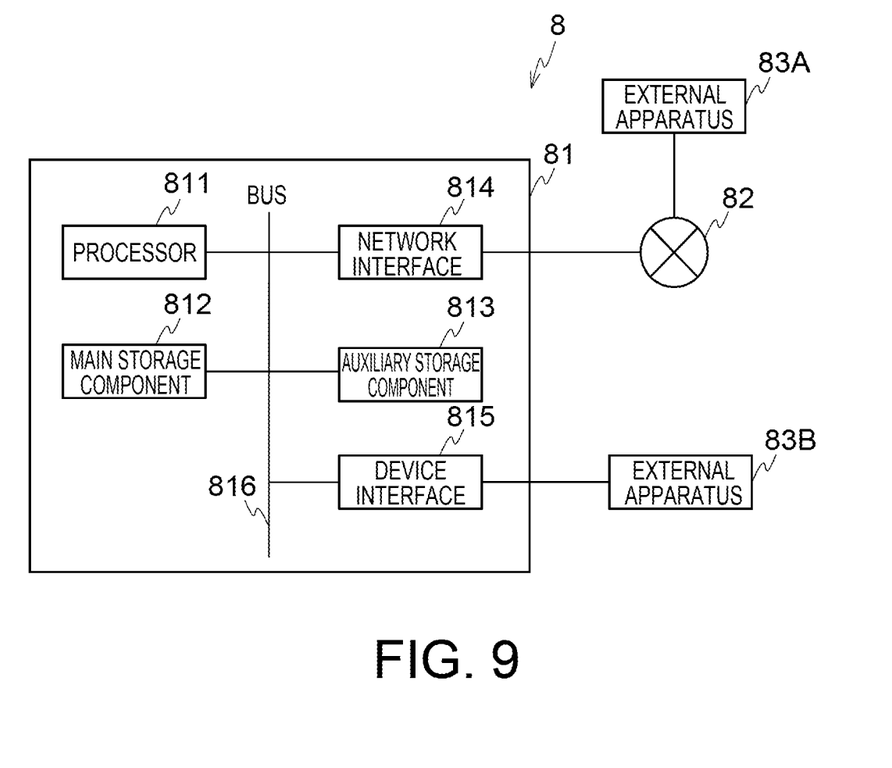
FIG. 9 is a block diagram illustrating an example of a hardware configuration in one embodiment of the present invention.

FIG. 9 is a block diagram illustrating an example of a hardware configuration in one embodiment of the present invention. FIG. 9 illustrates an information system 8, and in the example in FIG. 9, the information system 8 includes a computer apparatus 81 which implements the information processing apparatus 1, a communication network 82, and external apparatuses 83A and 83B.

The computer apparatus 81 includes a processor 811, a main storage component 812, an auxiliary storage component 813, a network interface 814, and a device interface 815, and these are connected via a bus 816. The storage 101 can be implemented with the main storage component 812 or the auxiliary storage component 813, and other components can be implemented with the processor 811.

Note that while the computer apparatus 81 in FIG. 9 includes components one each, the computer apparatus 81 may include a plurality of the same components. Further, while FIG. 9 illustrates one computer apparatus 81, software may be installed on a plurality of computer apparatuses, and each of the plurality of computer apparatuses may execute different part of processing of the software.

The processor 811 is an electronic circuit including a control component and a computation component of the computer. The processor 811 performs computation processing on the basis of data and a program inputted from each component, or the like, of an internal configuration of the computer apparatus 81 and outputs a computation result and a control signal to each component, or the like. Specifically, the processor 811 controls components constituting the computer apparatus 81 by executing an operating system (OS) of the computer apparatus 81, an application, or the like. The processor 811 is not particularly limited, if the processor 811 can perform the above-described processing.

The main storage component 812 is a storage component which stores a command to be executed by the processor 811, various kinds of data, or the like, and information stored in the main storage component 812 is directly read out by the processor 811. The auxiliary storage component 813 is a storage component other than the main storage component 812. Note that these storage components mean arbitrary electronic parts in which electronic information can be stored, and may be either a memory or a storage. Further, while the memory includes a volatile memory and a non-volatile memory, either one may be used.

The network interface 814 is an interface for connecting to the communication network 82 in a wireless or wired manner. As the network interface 814, it is only necessary to use one complying with existing communication standards. Information may be exchanged with an external apparatus 83A which is connected via the communication network 82 using the network interface 814.

The device interface 815 is an interface such as a USB which directly connects to an external apparatus 83B. The external apparatus 83B may be either an external storage medium or a storage apparatus such as a database.

The external apparatuses 83A and 83B may be output apparatuses. The output apparatus may be, for example, a display apparatus which displays an image or an apparatus which outputs speech, or the like. For example, the output apparatus includes, but not limited to a liquid crystal display (LCD), a cathode ray tube (CRT), a plasma display panel (PDP), a speaker.

Note that the external apparatuses 83A and 83B may be input apparatuses. The input apparatus includes a device such as a keyboard, a mouse, a touch panel, and provides information inputted through these devices to the computer apparatus 81. A signal from the input apparatus is outputted to the processor 811.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic information processing apparatus comprising:
    a processor programmed to:
        acquire electronic content for an electronic information model, the electronic content including addition of lacking information;
        determine whether or not the content violates a rule determined in advance for the information model; and
        when determined not to violate the rule, output electronic information which recommends editing the information model by reminding a user of the lacking information on a basis of:
            the content, and at least one of:
                a function template to which information set to the information model is applicable, or
                a function model to which the information set to the information model is applied,
        wherein:
            the information model includes a class indicating classification of an object and properties representing characteristics of the object, the properties being related to the class;
            the function template includes setting values of attributes of the class or the properties, or setting values of the properties; and
            the function model is generated by applying the setting values of the function template to the class or the properties.

2. The information processing apparatus according to claim 1,
    wherein the information model includes a class or a property having attributes, and
    the processor is further configured to cause the processor to output information which recommends setting information for at least one of the attributes or adding a new property to the information model.

3. The information processing apparatus according to claim 1,
    wherein the processor is further configured to cause the processor to set information for at least one of the attributes.

4. The information processing apparatus according to claim 1,
    wherein processor is further configured to cause the processor to:
        detect a function template or a function model relating to the content,
        detect attributes which are applicable by the detected function template or which are applied by the detected function model among attributes of the information model, and
        output information which recommends setting information for at least one of the detected attributes.

5. The information processing apparatus according to claim 1,
    wherein processor is further configured to cause the processor to:
        detect a class or a property similar to a class or a property relating to the content from the information model,
        detect a function template to which information set for attributes of the detected class or property is applicable or a function model to which information set for the attributes of the detected class or property is applied, detect attributes which are applicable by the detected function template or which are applied by the detected function model among attributes of the information model, and output information which recommends setting information for at least one of the detected attributes.

6. The information processing apparatus according to claim 5, wherein the processor is further configured to cause the processor to:

detect attributes which have a class or a property relating to the content and for which information is not set among the detected attributes, and output information which recommends setting information for the attributes.

7. The information processing apparatus according to claim 5, wherein the processor is further configured to cause the processor to:

detect attributes which do not have a class or a property relating to the content among the detected attributes, and output information which recommends adding the attributes and information to be set for the attributes to the class or the property relating to the content.

8. The information processing apparatus according to claim 1, wherein the processor is further configured to cause the processor to:

detect a property similar to a property relating to the content from the information model, detect a function template to which the detected property is applicable, and output information which recommends adding a new property to the information model in a case where the information model does not include a property similar to another property which is applicable to the detected function template.

9. The information processing apparatus according to claim 1, wherein the processor is further configured to cause the processor to:

convert a relationship between classes and properties included in the information model into a relational expression, convert the content into a mathematical expression, and determine that the rule is not violated in a case where the mathematical expression satisfies the relational expression.

10. The information processing apparatus according to claim 1, wherein the processor is further configured to cause the processor to:

propose to generate a function model relating to the content.

11. The information processing apparatus according to claim 1, wherein the processor is further configured to cause the processor to:

output proposed information and obtain approval for the outputted proposal.

12. An electronic information processing method comprising:

acquiring electronic content for an electronic information model, the electronic content including addition of lacking information;

determining whether or not the content violates a rule determined in advance for the information model; and when determined not to violate the rule, outputting electronic information which recommends editing the information model by reminding a user of the lacking information on a basis of:

the content, and at least one of:

a function template to which information set to the information model is applicable, or a function model to which the information set to the information model is applied, wherein:

the information model includes a class indicating classification of an object and properties representing characteristics of the object, the properties being related to the class;

the function template includes setting values of attributes of the class or the properties, or setting values of the properties; and the function model is generated by applying the setting values of the function template to the class or the properties.

13. A non-transitory storage medium in which a program to be executed by a computer is stored, the program comprising:

acquiring electronic content for an electronic information model, the electronic content including addition of lacking information;

determining whether or not the content violates a rule determined in advance for the information model; and when determined not to violate the rule, outputting electronic information which recommends editing the information model by reminding a user of the lacking information on a basis of:

the content, and at least one of:

a function template to which information set to the information model is applicable, or a function model to which the information set to the information model is applied, wherein:

the information model includes a class indicating classification of an object and properties representing characteristics of the object, the properties being related to the class;

the function template includes setting values of attributes of the class or the properties, or setting values of the properties; and the function model is generated by applying the setting values of the function template to the class or the properties.

* * * * *